US008577816B2

(12) United States Patent  (10) Patent No.: US 8,577,816 B2
Cantin  (45) Date of Patent: Nov. 5, 2013

(54) OPTIMIZED SEEDING OF EVOLUTIONARY ALGORITHM BASED SIMULATIONS

(75) Inventor: Jason F. Cantin, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 797 days.

(21) Appl. No.: 12/648,959

(22) Filed: Dec. 29, 2009

(65) Prior Publication Data

US 2011/0161264 A1  Jun. 30, 2011

(51) Int. Cl.
*G06F 15/18* (2006.01)
*G06N 3/00* (2006.01)
*G06N 3/12* (2006.01)

(52) U.S. Cl.
USPC .......................................................... 706/13

(58) Field of Classification Search
USPC ................................................. 706/13, 12, 62
See application file for complete search history.

(56) References Cited

U.S. PATENT DOCUMENTS

| | | | |
|---|---|---|---|
| 5,222,192 A | 6/1993 | Shaefer | |
| 5,245,696 A | 9/1993 | Stork et al. | |
| 6,088,510 A | 7/2000 | Sims | |
| 7,328,194 B2 | 2/2008 | Dimitriou et al. | |
| 7,337,154 B2 | 2/2008 | Manson et al. | |
| 2006/0080268 A1 | 4/2006 | Afeyan et al. | |
| 2006/0218107 A1 | 9/2006 | Young | |
| 2007/0094161 A1 | 4/2007 | Calabro et al. | |
| 2008/0168015 A1 | 7/2008 | Thie et al. | |

OTHER PUBLICATIONS

Poli et al, "Elitism Reduces Bloat in Genetic Programming", GECCO'08, Jul. 12-16, 2008, Atlanta, Georgia, USA.*
Deb et al, "Evaluating the Domination Based Multi-Objective Evolutionary Algorithm for a Quick Computation of Pareto-Optimal Solutions", Evolutionary Computation 13(4): 501-525, Massachusetts Institute of Technology, 2005.*
Gilani et al, "Distortion Estimation in Digital Image Watermarking using Genetic Programming", Transactions on Engineering, Computing and Technology vol. 15 Oct. 2006 ISSN 1305-5313.*
Marti et al, "A Cumulative Evidential Stopping Criterion for Multiobjective Optimization Evolutionary Algorithms", GECCO'07, Jul. 7-11, 2007, London, England, United Kingdom., hereinafter "Marti".*

(Continued)

*Primary Examiner* — Jeffrey A Gaffin
*Assistant Examiner* — Ilya Traktovenko
(74) *Attorney, Agent, or Firm* — DeLizio Gilliam, PLLC (57) ABSTRACT

Seed candidate solutions can be inserted into the later generations of the population of an optimization problem during an evolutionary algorithm based simulation. Seed candidate solutions can be determined in response to an evolutionary algorithm based simulator receiving a problem description of an optimization problem. The seed candidate solutions can be sorted according to the seed candidate solutions' fitness. The simulator can start an evolutionary algorithm based simulation with a randomly generated initial population. The simulator can detect a condition for inserting seed candidate solutions into the population. The simulator can then insert the first seed candidate into the current population that is generated by the simulator in accordance with the evolutionary algorithm. A solution to the optimization problem can be determined based on successive generation of candidate solutions and insertion of additional seed candidate solutions in subsequent generations of the population.

20 Claims, 5 Drawing Sheets

(56) References Cited

OTHER PUBLICATIONS

Hu et al, "Adaptive Hierarchical Fair Competition (AHFC) Model for Parallel Evolutionary Algorithms", GECCO '02 Proceedings of the Genetic and Evolutionary Computation Conference, 2002 Article, pp. 772-779.*

Hoffmann et al, "Fitness Threshold Accepting over Extremal Optimization ranks", Department of Mathematics and Statistics, San Diego State University, San Diego, California 92182, U.S.A, (Dated: Jul. 23, 2004).*

Hernandez et al, "Towards a Self-Stopping Evolutionary Algorithm Using Coupling From the Past", GECCO'05, Jun. 25-29, 2005, Washington, DC, USA.*

Pedersen, "Genetic Algorithms for Rule Discovery in Data Mining", Daimi, University of Aarhus, Oct. 2003.*

Koza, et al, "Parallel Genetic Programming on a Network of Transputers", Report No. STAN-CS-TR-95-1542, Jan. 1995.*

LaRoche et al, "802.11 Network Intrusion Detection using Genetic Programming", GECCO'05, Jun. 25-29, 2005, Washington, DC, USA.*

Goncalves et al, "An evolutionary algorithm for manufacturing cell formation", bInternet and Network Systems Research, AT&T Labs Research, 180 Park Avenue, Bldg. 103, Room C241, Florham Park, NJ 07932, USA, accepted Jul. 14, 2004, Available online Sep. 11, 2004.*

Ray, "Constrained Robust Optimal Design using a Multiobjective Evolutionary Algorithm", Proceedings of the 2002 Congress on Evolutionary Computation, 2002. CEC '02, Date of Conference: May 12-17, 2002, vol. 1, pp. 419-424.*

Deb et al, "Controlled Elitist Non-dominated Sorting Genetic Algorithms for Better Convergence", EMO 2001, LNCS 1993, pp. 67-81, 2001.*

Laumanns et al, "Combining Convergence and Diversity in EvolutionaryMulti-Objective Optimization", Evolutionary Computation vol. 10, No. 3, 2002.*

Tan et al, "Evolving better population distribution and exploration in evolutionary multi-objective optimization", 2004 Elsevier B.V. All rights reserved, doi:10.1016/j.ejor.2004.08.038.*

Nunez et al, "Modeling and Simulation Optimization Using Evolutionary Computation", 2006, Technical Report, Colsa Corporation, Huntsville, USA.*

Balakrishnan, P.V. et al., "Development of hybrid genetic algorithms for product line designs", Systems, Man, and Cybernetics, Part B, IEEE Transactions onvol. 34, Issue 1 Feb. 2004, pp. 468-483.

Brown, Daniel G., "Optimizing multiple seeds for protein homology search", Computational Biology and Bioinformatics, IEEE/ACM Transactions, vol. 2, Issue 1 Jan.-Mar. 2005, pp. 29-38.

Cinque, Luigi et al., "Improvement in range segmentation parameters tuning", Pattern Recognition, 2002. Proceedings. 16th International Conference, vol. 1 Aug. 15, 2002, pp. 176-179.

Guan, Hong-Bo et al., "The briefest reduct of rough sets based on genetic algorithm", IT in Medicine and Education, 2008. ITME 2008. IEEE International Symposium Dec. 2008, pp. 23-27.

Khodabakhshi, A. H. et al., "An efficient data structure for applying multiple seeds in homology search", Bioinformatics and Bioengineering, 2007. BIBE 2007. Proceedings of the 7th IEEE International Conference Oct. 2007, pp. 1374-1378.

Li, Xiaodong et al., "The effects of varying population density in a fine-grained parallel genetic algorithm", Evolutionary Computation, 2002. CEC '02. Proceedings of the 2002 Congress, vol. 2 May 2002, pp. 1709-1714.

* cited by examiner

OPTIMIZED SEEDING OF EVOLUTIONARY ALGORITHM BASED SIMULATIONS

BACKGROUND

Embodiments of the inventive subject matter generally relate to the field of evolutionary algorithm based simulations, and, more particularly, to optimizing seeding of evolutionary algorithm based simulations.

Evolutionary algorithms use biological techniques based on biological evolution, reproduction, mutation, recombination, and natural selection to find solutions to optimization problems. Simulations that implement evolutionary algorithms act upon populations, such that individuals in a population represent candidate solutions to an optimization problem. The candidate solutions are evaluated for fitness and the population "evolves" as successive generations of the population are selected/generated based on the biological techniques. As the population evolves, overall fitness of the population tends to increase. A solution to the optimization problem is found when the overall fitness of the population has reached a satisfactory level. Simulations based on evolutionary algorithms can perform well for finding solutions to problems in engineering, biology, economics, robotics, etc. because fitness evaluation functions can be tailored to fit the problems.

SUMMARY

Embodiments include a method directed to determining that a criterion for inserting seed candidate solutions for an optimization problem has been met while an evolutionary algorithm based computer simulation is running and after a first selected generation of candidate solutions has been determined by the computer simulation. In some embodiments, at least a first dataset that represents a first seed candidate solution and can be inserted into a current generation of candidate solutions generated by the computer simulation in response to determining that the criterion for inserting seed candidate solutions has been met. A solution for the optimization problem can be generated from the computer simulation based, at least in part, on a successive generation of candidate solutions produced after said inserting, into the current generation of candidate solutions generated by the computer simulation, at least the first dataset that represents the first candidate solution.

Embodiments include a computer program product for optimizing seeding of evolutionary algorithm based simulations. The computer program product comprises a computer usable medium having computer usable program code. In some embodiments, the computer usable program code is configured to determine that a criterion for inserting seed candidate solutions for an optimization problem has been met while an evolutionary algorithm based computer simulation is running and after a first selected generation of candidate solutions has been determined by the computer simulation. At least a first dataset that represents a first seed candidate solution and can be inserted into a current generation of candidate solutions generated by the computer simulation in response to determining that the criterion for inserting seed candidate solutions has been met. A solution for the optimization problem can be generated from the computer simulation based, at least in part, on a successive generation of candidate solutions produced after said inserting, into the current generation of candidate solutions generated by the computer simulation, at least the first dataset that represents the first candidate solution.

Embodiments include a computer program product for optimizing seeding of evolutionary algorithm based simulations. The computer program product comprises a computer usable medium having computer usable program code. In embodiments, the computer usable program code is configured to determine a plurality of seed candidate solutions to insert into an optimization problem. Fitness metrics of each of the plurality of seed candidate solutions can be determined. When a criterion for inserting seed candidate solutions has been met by a first selected generation of candidate solutions while an evolutionary algorithm based computer simulation is running, the plurality of seed candidate solutions can be inserted into subsequent generations of candidate solutions based, at least in part, on the fitness metrics.

Embodiments include an apparatus comprising a processing unit, a network interface, and an evolutionary algorithm based simulator. In some embodiments, the evolutionary algorithm based simulator is operable to determine that a criterion for inserting seed candidate solutions for an optimization problem has been met while an evolutionary algorithm based computer simulation is running and after a first selected generation of candidate solutions has been determined by the computer simulation. At least a first dataset that represents a first seed candidate solution and can be inserted into a current generation of candidate solutions generated by the computer simulation in response to determining that the criterion for inserting seed candidate solutions has been met. A solution for the optimization problem can be generated from the computer simulation based, at least in part, on a successive generation of candidate solutions produced after said inserting, into the current generation of candidate solutions generated by the computer simulation, at least the first dataset that represents the first candidate solution.

BRIEF DESCRIPTION OF THE DRAWINGS

The present embodiments may be better understood, and numerous objects, features, and advantages made apparent to those skilled in the art by referencing the accompanying drawings.

FIGS. 2-3 are flowcharts depicting example operations for inserting seed candidate solutions during an evolutionary algorithm based simulation.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to evolutionary algorithm based simulations, embodiments can utilize specific types of evolutionary algorithms (e.g., genetic algorithms, genetic programming, evolutionary programming, evolution strategy, etc.) suited to fit a particular type of optimization problem being solved. In other instances, wellknown instruction instances, protocols, structures, and techniques have not been shown in detail in order not to obfuscate the description.

The candidate solutions to an optimization problem comprise a set of potential parameters than can be applied to variables in the problem. For example, an electronic design may be optimized. Variables in the electronic design can include transmission line length, transmission line spacing, driver strengths, etc. The candidate solutions represent a set of potential parameters that can be applied to the line length, transmission line spacing, and driver strength variables in the electronic design. Usually, an initial population (i.e., generation 0) of candidate solutions is randomly chosen based on a domain of the optimization problem. The randomly generated initial population tends to be unfit, so it can take many generations for the population to reach a satisfactory level of fitness. Seeding helps to decrease the number of generations generated to find an optimal solution. Usually, the initial population is seeded with candidate solutions that are likely to be near optimal solutions so that the initial population comprises seed candidate solutions and randomly generated candidate solutions. The seed candidate solutions are usually more fit than the randomly generated candidate solutions and have a higher likelihood of being chosen for successive generations. So, weaker candidate solutions are eliminated from the population much faster. However, quickly eliminating weaker candidate solutions can cause an evolutionary algorithm based simulation to converge on local optima (e.g., the seeds themselves, and/or minor variations of the seeds) because strong components of the weaker candidate solutions may never have a chance to affect the population.

Seed candidate solutions can be inserted into the later generations of the population of an optimization problem during an evolutionary algorithm based simulation. Inserting seed candidate solutions into later generations allow weaker candidate solutions with strong components or attributes to survive, thus allowing succeeding generations to inherit the stronger components. Seed candidate solutions can be determined based on a problem description of an optimization problem. The seed candidate solutions can be sorted according to the seed candidate solutions' fitness. The evolutionary algorithm based simulator can start an evolutionary algorithm based simulation with a randomly generated initial population. The evolutionary algorithm based simulator can later detect a condition for inserting seed candidate solutions into the population. For example, the evolutionary algorithm based simulator can detect that a number of generations has reached a threshold. As another example, the evolution algorithm based simulator can detect that overall fitness of the population has reached a threshold. The evolutionary algorithm based simulator can then insert the first seed candidate into the current population that is generated/selected by the evolutionary algorithm based simulator in accordance with the evolutionary algorithm. A solution to the optimization problem can be determined based on a generation of candidate solutions influenced by the insertion of additional seed candidate solutions in $N^{th}$ generations of the population.

Figure 1:
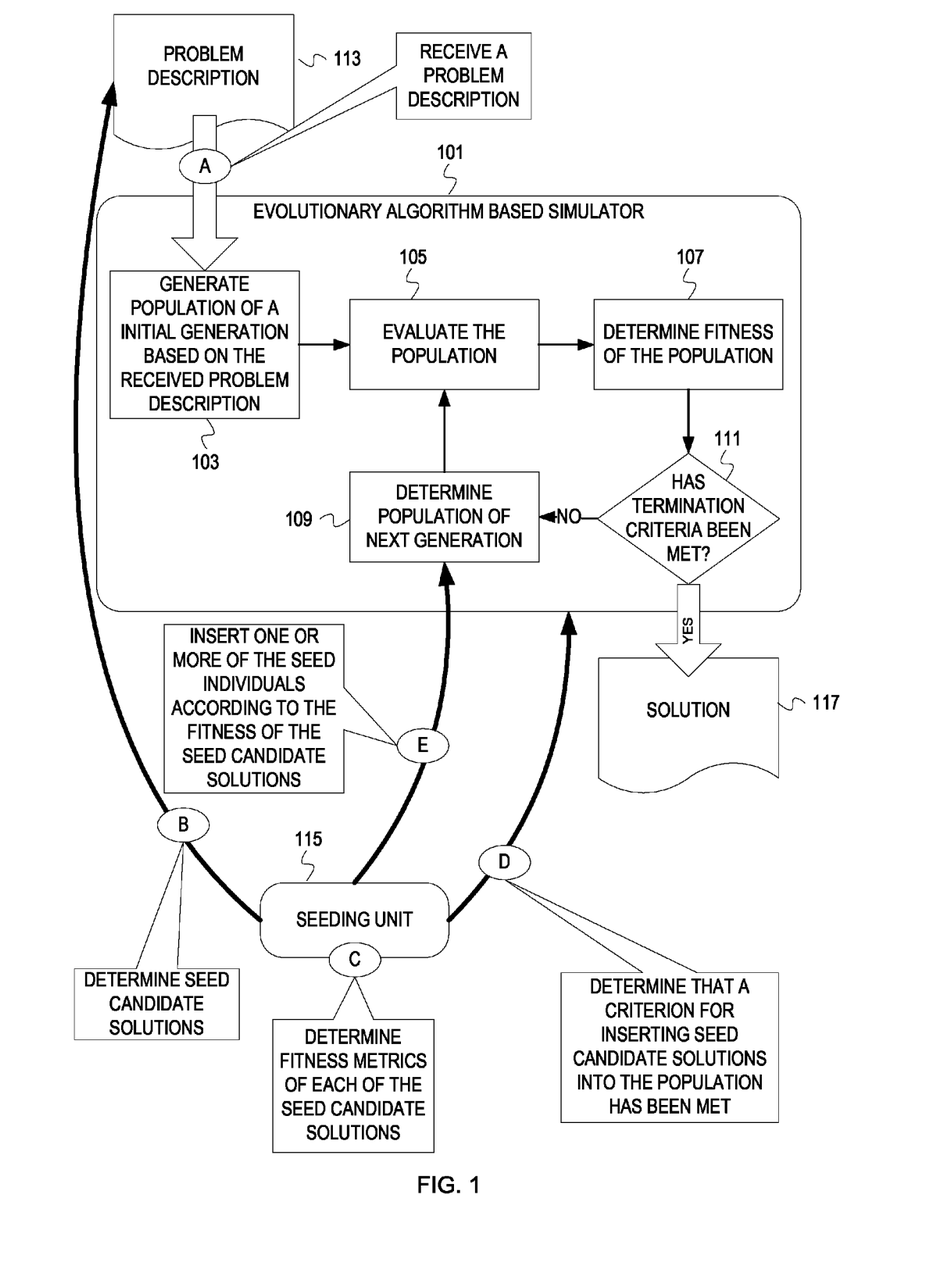
FIG. 1 is an example conceptual diagram of inserting seed candidate solutions during an evolutionary algorithm based simulation.

FIG. 1 is an example conceptual diagram of inserting seed candidate solutions during an evolutionary algorithm based simulation. At stage A, an evolutionary algorithm based simulator 101 receives a problem description 113. The problem description 113 can define the optimization problem. Examples of optimization problems include input/output (I/O) circuit design, high performance computing (HPC) bidding, adder design, compiler tuning, etc. The problem description 113 can indicate variables of the optimization problem, a domain for the candidate solutions, constraints, a fitness evaluation function, seed candidate solutions, criteria for inserting the seed candidate solutions, termination criteria, etc.

The evolutionary algorithm based simulator 101 generates a population of an initial generation (i.e., generation 0) based on the received problem description (103). The population comprises a plurality of candidate solutions to the optimization problem. Each of the candidate solutions can be represented by a dataset that can be organized based on the variables of the optimization problem. Each dataset stores one value/parameter for each of the variables, such that an optimization problem with N variables has datasets comprising N parameters. The evolutionary algorithm based simulator 101 determines a number of candidate solutions to generate based on the problem description 113. For example, the problem description 113 indicates that the population should comprise 100 candidate solutions. The evolutionary algorithm based simulator 101 can randomly generate parameters for the candidate solutions based on the domain indicated in the problem description 113. For example, the optimization problem can comprise three variables: var_1, var_2, and var_3. The domain indicates that parameters in the candidate solution should lie within ranges (0, 10), (5, 26], and [−10, 10] for var_1, var_2, and var_3, respectively. The domain also specifies that var_1 and var_3 cannot be equal in any particular candidate solution. So, the evolutionary algorithm based simulator 101 generates random numbers (i.e., the parameters) for each of the variables based on the ranges and makes sure that the generated random numbers are not the same for var_1 and var_3. The evolutionary algorithm based simulator 101 continues to generate groups of three random numbers for var_1, var_2, and var_3 until the number of candidate solutions is reached. After determining the initial population, the evolutionary algorithm based simulator 101 begins an evolutionary algorithm based simulation.

The evolutionary algorithm based simulator 101 evaluates the population (105). The evolutionary algorithm based simulator 101 evaluates each candidate solution based on applying the parameters indicated in the candidate solutions to variables in the optimization problem and running a simulation of the candidate solution. For example, an electronic design can be defined in the problem description 113. The evolutionary algorithm based simulator 101 can generate simulation decks for each candidate solution based on applying the parameters indicated by each candidate solution to variables of the electronic design. The evolutionary algorithm based simulator 101 can run a simulation of each simulation deck using a Simulation Program with Integrated Circuit Emphasis (SPICE) simulation tool and collect results of each simulation. As another example, the problem description 113 indicates a computer program to be optimized. The evolutionary algorithm based simulator 101 can run the computer program for each of the candidate solutions by applying the parameters of the candidate solutions to variables of the computer program. The evolutionary algorithm based simulator 101 can collect results of each run of the computer program. The techniques (e.g., SPICE simulations, running computer programs, etc.) for evaluating the population can be defined as part of the fitness evaluation function indicated in the problem description 113.

The evolutionary algorithm based simulator 101 determines fitness of the population (107). The fitness can be represented by a numerical value within a range specified in the problem description 113. For example, the fitness can be represented by a percentage. Determining fitness of the population 107 can comprise determining individual fitness metrics of each candidate solution. The evolutionary algorithm based simulator 101 can determine each candidate solution's individual fitness metric based on the fitness evaluation function indicated in the problem description 113. For example, the evolutionary algorithm based simulator 101 can analyze the simulation results of each candidate solution based on indicated heuristics. The evolutionary algorithm based simulator 101 can determine the fitness of the population based on aggregating the individual fitness metrics. For example, the evolutionary algorithm based simulator 101 can average the individual fitness metrics. As another example, the evolutionary algorithm based simulator 101 can take the median of the individual fitness metrics.

The evolutionary algorithm based simulator 101 determines if termination criteria has been met (111). Termination criteria can be indicated in the problem description 113. For example, the evolutionary algorithm based simulation may terminate when fitness of the population reaches an indicated satisfactory level. As another example, the evolutionary algorithm based simulation may terminate when fitness of the population reaches a plateau. As another example, the evolutionary algorithm based simulation may terminate when a specified number of generations has been reached. If termination criteria have been met, a solution 117 is output by the evolutionary algorithm based simulator 101. The solution 117 can comprise indications of each of the candidate solutions that constitute the population at termination, individual fitness metrics of each of the candidate solutions, simulation/test results, etc.

If the termination criteria have not been met, the evolutionary algorithm based simulator 101 determines a next generation of the population (109). For example, the current generation is generation 0, so the evolutionary algorithm based simulator 101 determines a generation 1. The evolutionary algorithm based simulator 101 can determine the next generation in accordance with a combination of biological techniques based on evolution, reproduction, mutation, recombination, and natural selection. For example, the evolutionary algorithm based simulator 101 can select a certain number of the candidate solutions of generation 0 to remain unchanged in generation 1 based on survival of the fittest techniques. The unchanged individuals can represent a portion of the population of generation 1. As another example, the evolutionary algorithm based simulator 101 can select candidate solutions from generation 0 as parents to reproduce offspring candidate solutions for a portion of the population of generation 1. As another example, another portion of the population can be generated based on mutating candidate solutions of generation 0. In addition, a seeding unit 115 can insert candidate solutions into the next generation when the seeding unit 115 detects a condition for inserting the candidate solutions. After the next generation of the population is determined, the evolutionary algorithm based simulator 101 repeats the evaluation (105) and determination of fitness (107) on the next generation. The blocks 105, 107, 111, and 109 repeat for each successive generation until termination criteria is met.

At stage B, the seeding unit 115 determines points in the domain that solutions are likely to be found ("seed candidate solutions") from the problem description 113. The seed candidate solutions can be selected by a designer of the problem based on the designer's experience.

At stage C, the seeding unit 115 determines fitness metrics of each of the seed candidate solutions. The seeding unit 115 uses the fitness evaluation function indicated in the problem description 113 to determine the fitness metrics of each of the seed candidate solutions. For example, the seeding unit 115 simulates each of the seed candidate solutions and determines fitness metrics based on the results of the simulation.

Stages B and C can occur while the initial population is generated (103) by the evolutionary algorithm based simulator 101.

At stage D, the seeding unit 115 determines that a criterion for inserting seed candidate solutions into the population has been met. Criteria for inserting seed candidate solutions can be indicated in the problem description 113. For example, the seeding unit 115 determines that seed candidate solutions should be inserted after a certain number of generations have been determined. The seeding unit 115 determines if a variable representing a number of the current generation equals the number of generations. As another example, the seeding unit can determine that an aggregate fitness metric of the population determined in block 107 meets a fitness threshold indicated in the problem description 113. As another example, the seeding unit determines that seed candidate should be inserted when either the number of generations is met or the fitness threshold is satisfied.

At stage E, the seeding unit 115 inserts one or more of the seed individuals into the population of the next generation according to fitness of the seed candidate solutions. For example, the seeding unit 115 inserts seed candidate solutions into successive generations in the order of least to most fit. The insertions into the successive generations can be based on an insertion interval that defines the average number of generations between insertions of the seed candidate solutions. As another example, seed candidate solutions can be inserted based on the fitness of each seed candidate solution and fitness of the population. For example, seed candidate solutions with fitness within a threshold of the population's fitness can be inserted.

The seeding unit 115 can deposit datasets representing the seed candidate solutions into a memory location accessible by both the evolutionary algorithm based simulator 101 and the seeding unit 115. The evolutionary algorithm based simulator 101 can determine the seed candidate solutions from the memory location. Before determining candidate solutions for the population of the next generation based on the biological techniques, the evolutionary algorithm based simulator 101 can check the memory location. If a dataset is found in the memory location, the evolutionary algorithm based simulator 101 can add the dataset representing the candidate solutions into the population of the next generation then determine the remainder of candidate solutions for the next generation based on the biological techniques.

Although FIG. 1 depicts the seeding unit 115 as a separate entity from the evolutionary algorithm based simulator 101, the seeding unit 115 can be a component of the evolutionary algorithm based simulator 101.

Figure 2:
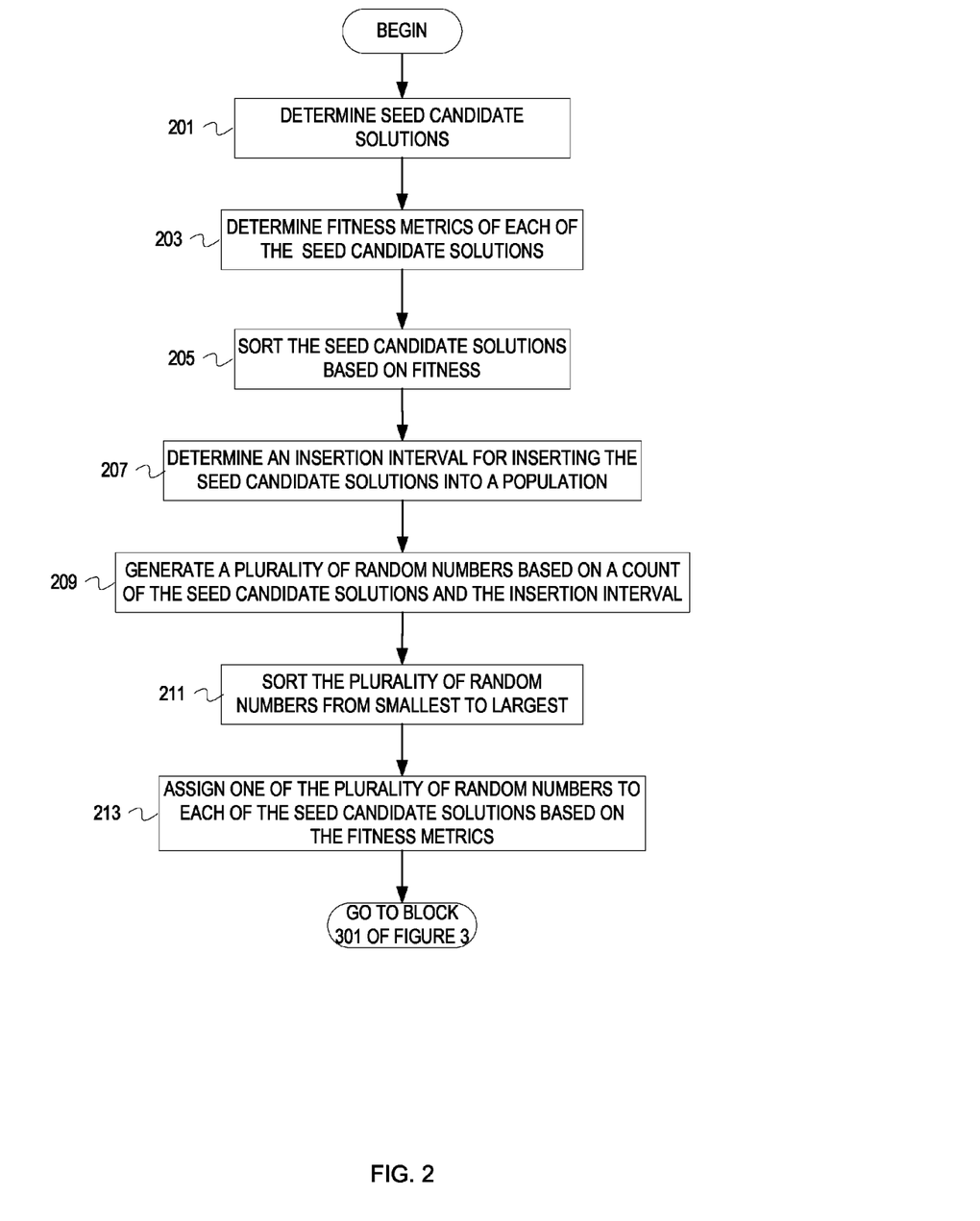
Figure 3:
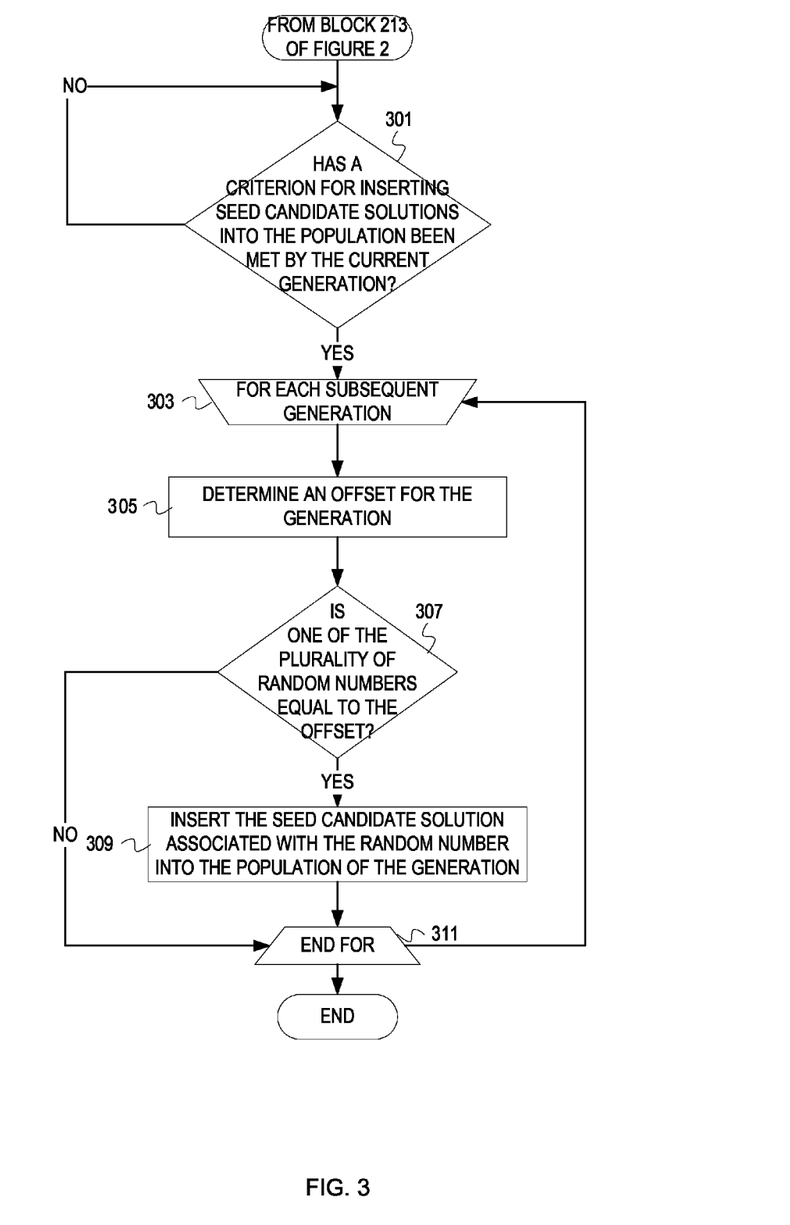
FIG. 3 is a flowchart depicting example operations for inserting seed candidate solutions during an evolutionary algorithm based simulation that continues from FIG. 2.

FIGS. 2-3 are flowcharts depicting example operations for inserting seed candidate solutions during an evolutionary algorithm based simulation. At block 201, seed candidate solutions are determined in response to an evolutionary algorithm based simulator receiving a problem description. The problem description can indicate the seed candidate solutions. For example, the problem description can indicate a reference to datasets that represent the seed candidate solutions. Each dataset can comprise one parameter for each variable defined in the problem description.

At block 203, fitness metrics of each of the seed candidate solutions is determined. The fitness metrics can be determined using a fitness evaluation function indicated in the problem description. The problem description can include a code/script implementing the fitness evaluation function, a reference to the code, a code hash value, etc. The fitness metrics can be represented by a numerical value within a specified range. A designer of the optimization problem can provide the fitness evaluation function and range for the fitness metrics. A fitness metric of each seed candidate solution can be stored in the dataset that represents the seed candidate solution.

At block 205, the seed candidate solutions are sorted based on fitness. In this example, the seed candidate solutions can be sorted from least to most fit based on the fitness metrics.

At block 207, an insertion interval for inserting seed candidate solutions into a population are determined. The insertion interval can indicate the average number of generations between insertions of the seed candidate solutions into the population. For example, an insertion interval of 0.5 can indicate that an average of two seed candidate solutions should be inserted into every generation. As another example, an insertion interval of 2 can indicate that an average of one seed candidate solution should be inserted every other generation.

At block 209, a plurality of random numbers is generated based on a count of the seed candidate solutions and the insertion interval. The plurality of random numbers can be generated within the range of 0 to the count multiplied by the insertion interval (i.e., between 0 and (count*insertion interval)). An average distance between the random numbers should be close to the insertion interval because the random numbers were generated based on the count and the insertion interval.

At block 211, the plurality of random numbers is sorted from smallest to largest.

At block 213, one of the plurality of random numbers is assigned to each of the seed candidate solution based on the fitness metrics. The assignment can be made such that the smallest random number is assigned to the least fit seed candidate solution and the largest random number is assigned to the most fit seed candidate solution. Assigning one of the plurality of random numbers to each of the seed candidate solutions can comprise storing the random number in a dataset that represents each of the candidate solutions. Each of the plurality random numbers can indicate a generation of the population to insert the corresponding seed candidate solutions. For example, when the generation number is equal to one of the plurality of random numbers, a seed candidate solution corresponding to the random number can be inserted into the population. An average number of generations between insertions of the seed candidate solutions should be the insertion interval because the random numbers were generated based on the insertion interval. Flow continues at block 301 of FIG. 3.

FIG. 3 is a flowchart depicting example operations for inserting seed candidate solutions during an evolutionary algorithm based simulation that continues from FIG. 2. At block 301, it is determined if a criterion for inserting seed candidate solutions into the population has been met by the current generation. Once the criterion is met, seed individuals can be inserted into the next generation. For example, the criterion indicates that seed individuals should be inserted after a certain number of generations of the population have been evaluated. As another example, the criterion indicates that seed individuals should be inserted after a fitness threshold has been satisfied by the population. When an aggregate fitness metric of the candidate solutions that constitute the population is equal to or greater than the fitness threshold, seed candidate solutions can be inserted into the population. The fitness metric can be based on an average of the candidate solutions' fitness metrics, a median of the candidate solutions fitness metrics, etc. In addition, the criterion can be based on a combination of a fitness threshold and a number of generations. For example, a criterion indicates that seed individuals can be inserted after the fitness of the population satisfies the fitness threshold and a certain number of generations have been evaluated.

At block 303, a loop begins for each subsequent generation.

At block 305, an offset of the generation is determined. The offset can represent a number of generations that have been generated and evaluated by the evolutionary algorithm based simulator since the criterion was met.

At block 307, it is determined if one of the random numbers is equal to the offset. If one of the random numbers is equal to the offset, flow continues at block 309. If none of the random numbers are equal to the offset, flow continues at block 311.

At block 309, the seed candidate solution associated with the random number is inserted into the population of the generation. For example, an evolutionary algorithm based simulator can locate a dataset that represents the seed candidate solution based on the random number. The evolutionary algorithm based simulator can insert the dataset into the generation of candidate solutions. In some examples, the population may be comprised of multiple demes/sub-populations. Inserting the seed candidate solution can comprise determining one of the sub-populations in which the seed candidate solution should be inserted. For example, the evolutionary algorithm based simulator can insert the seed candidate solution into a randomly selected sub-population. As another example, the evolutionary algorithm based simulator can select the sub-population based on fitness and insert the seed candidate solution into the most fit sub-population.

At block 311, the loop for each subsequent generation ends.

Figure 4:
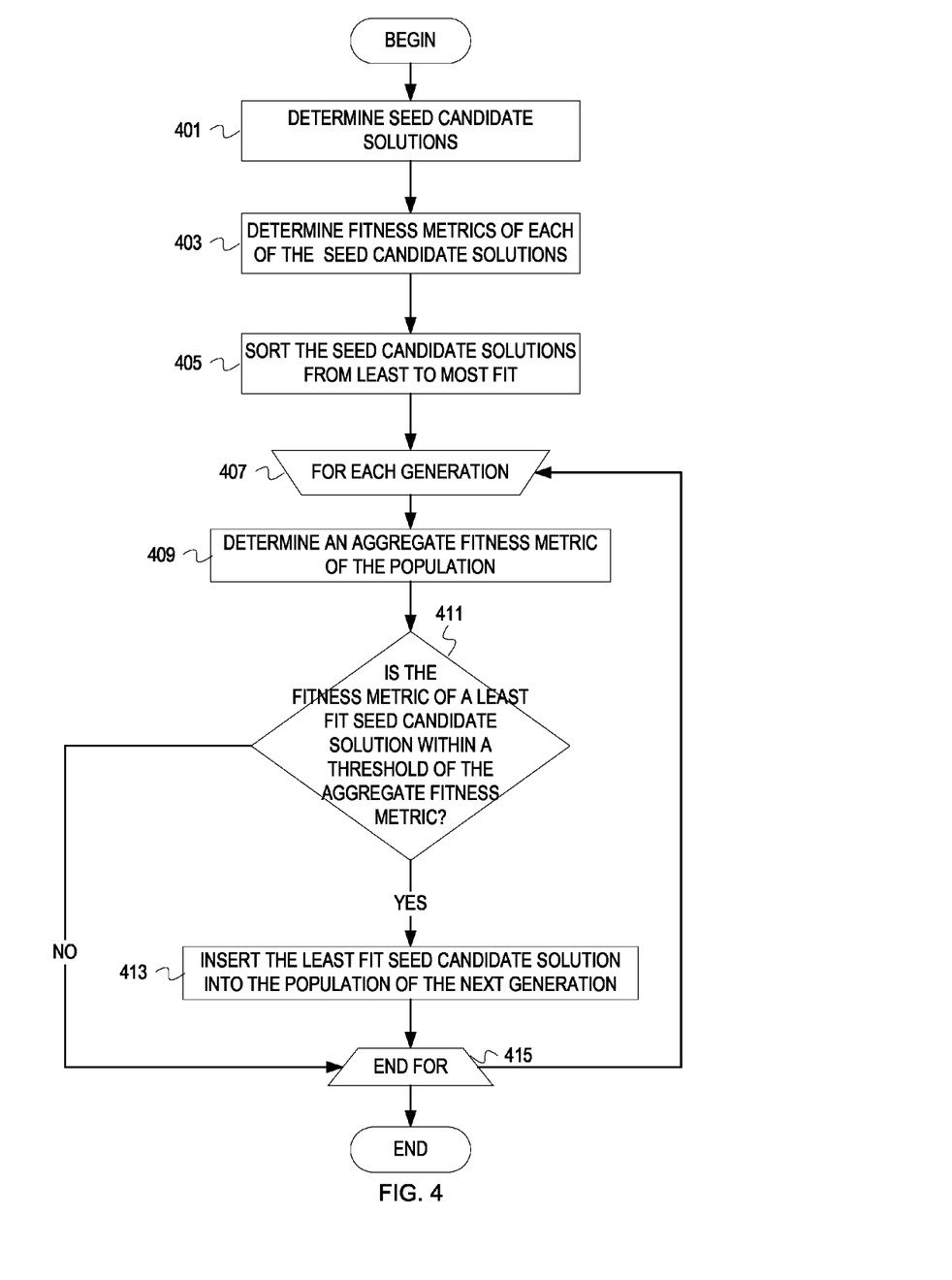
FIG. 4 is a flowchart of example operations for inserting seed candidate solutions during an evolutionary algorithm based simulation based on fitness.

Seeding a population with candidate solutions that are significantly more fit than other individuals in the population can cause the weaker individuals to be eliminated too rapidly. Seed candidate solutions can be inserted into the population when an aggregate fitness metric of the population is within a threshold of the seed candidate solutions' fitness metrics so that seed candidates are not inserted until the fitness of the population reaches the seed candidates' fitness levels. FIG. 4 is a flowchart of example operations for inserting seed candidate solutions during an evolutionary algorithm based simulation based on fitness. Flow begins at block 401, where seed candidate solutions are determined in response to an evolutionary algorithm based simulator receiving a problem description.

At block 403, fitness metrics of each of the seed candidate solutions is determined. The fitness metrics can be determined using a fitness evaluation function indicated in the problem description.

At block 405, the seed candidate solutions are sorted from least to most fit.

At block 407, a loop begins for each generation.

At block 409, an aggregate fitness metric of the population is determined. Determining the aggregate fitness metric can comprise determining individual fitness metrics of each of the candidate solutions that constitute the population. The individual fitness metrics can be determined based on a fitness evaluation function indicated in the problem description. The aggregate fitness metric can be based on an average of the individual fitness metrics, a median of the fitness metrics, etc. If the population is comprised of multiple demes/sub-populations, aggregate fitness metrics can be determined for each sub-population along with the aggregate fitness metric of the entire population.

At block 411, it is determined if a least fit candidate solution is within a threshold of the aggregate fitness metric. The threshold can be indicated in the problem description. For example, the least fit seed candidate's fitness metric is within the threshold if the least fit seed candidate's fitness metric does not deviate more than 10 percent from the aggregate fitness metric. More than one of the candidate solutions' fitness metrics can be within the threshold of the aggregate fitness metric. If the least fit seed candidate's fitness metric is within a threshold of the aggregate fitness metric, flow continues at block 413. If the least fit seed candidate's fitness metric is not within a threshold of the aggregate fitness metric, flow continues at block 415.

At block 413, the least fit seed candidate solution is inserted into the population of the next generation. When the least fit seed candidate solution is inserted, the fitness metric of the next least fit candidate is compared to the aggregate fitness metric, and so on until there are no more seed candidate solutions to insert. In addition, more than one seed candidate solution can be inserted into the population when more than one of the seed candidate solutions' fitness metrics are within the threshold of the aggregate fitness metric. If the population comprises multiple sub-populations, one of the sub-populations can be selected for inserting the least fit seed candidate solution. For example, the sub-population can be selected randomly. The least fit seed candidate solution can be inserted into the selected sub-population when the seed candidate solution's fitness metric is within a threshold of the sub-population's aggregate fitness metric.

At block 415, the loop ends.

Although examples refer to inserting seed candidate solutions from least to most fit, embodiments are not so limited. For example, the seed candidate solutions can be inserted into successive generations in random order. Each seed candidate solution can be assigned a random number. Seed candidate solutions can be sorted based on the corresponding random numbers. An insertion interval, N, can indicate the frequency for inserting the seed candidate solutions. So, the seed candidate solutions can be inserted every N generations based on the smallest to largest random numbers. As another example, all of the seed candidate solutions can be inserted into a selected generation at the same time.

Embodiments are not limited to the example flowcharts depicted in the above figures. Embodiments can perform additional operations, fewer operations, operations in parallel, etc. For instance, referring to FIG. 2 the operations for sorting the seed candidate solutions and sorting the random numbers can occur in parallel.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
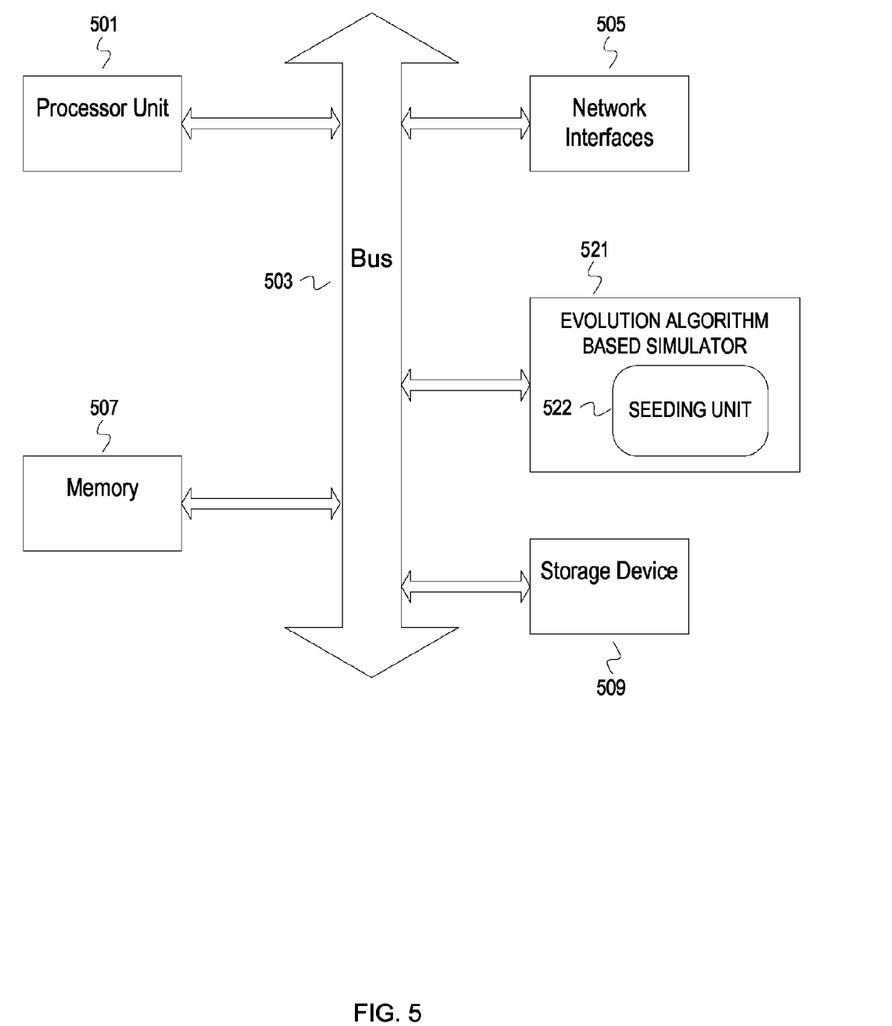
FIG. 5 depicts an example computer system.

FIG. 5 depicts an example computer system. A computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI bus, ISA, PCI-Express bus, HyperTransport® bus, InfiniBand® bus, NuBus bus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The computer system also includes an evolutionary algorithm based simulator 521. The evolutionary algorithm based simulator 521 finds solutions to optimization problems in accordance with evolutionary algorithms. The evolutionary algorithm based simulator 521 comprises a seeding unit 522. The seeding unit 522 can determine that a criterion for inserting seed candidate solutions into a generation of candidate solutions is satisfied and insert seed candidate solutions into the generation based on a fitness criterion and/or an insertion interval. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for optimizing seeding of evolutionary algorithm based simulations as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining that a criterion for inserting seed candidate solutions for an optimization problem has been met while an evolutionary algorithm based computer simulation is running and after a first selected generation of candidate solutions has been determined by the computer simulation;
   inserting, into a current generation of candidate solutions generated by the computer simulation, at least a first dataset that represents a first seed candidate solution in response to determining that the criterion for inserting seed candidate solutions has been met, wherein the seed candidate solutions are not derived from candidate solutions of earlier generations; and
   generating a solution for the optimization problem from the computer simulation based, at least in part, on a successive generation of candidate solutions produced after said inserting, into the current generation of candidate solutions generated by the computer simulation, at least the first dataset that represents the first candidate solution.

2. The method of claim 1 further comprising selecting the first dataset based, at least in part, on matching a random number associated with the first dataset to a count of generations up to the first selected generation; wherein the random number was associated with the first dataset based on a fitness metric of the first candidate solution represented by the first dataset.

3. The method of claim 1, wherein said determining that the criterion for inserting the candidate solutions for the optimization problem has been met comprises determining that an aggregate of fitness metrics of the current generation of candidate solutions meets or exceeds a fitness metric threshold.

4. The method of claim 1, wherein said determining that the criterion for inserting the candidate solutions for the optimization problem has been met comprises determining that a count of generations up to the first selected generation is equal to an indicated number of generations.

5. The method of claim 1, wherein said determining that the criterion for inserting the candidate solutions for the optimization problem has been met comprises determining that an aggregate of fitness metrics of the current generation is within a threshold of a fitness metric of the first candidate solution.

6. A computer program product for optimizing seeding of evolutionary algorithm based computer simulations, the computer program product comprising:
   a non-transitory computer readable storage medium having computer readable program code embodied therewith, the computer readable program code comprising:
   computer readable program code configured to,
      determine that a criterion for inserting seed candidate solutions for an optimization problem has been met while an evolutionary algorithm based computer simulation is running and after a first selected generation of candidate solutions has been determined by the computer simulation;
      insert, into a current generation of candidate solutions generated by the computer simulation, at least a first dataset that represents a first seed candidate solution in response to determining that the criterion for inserting seed candidate solutions has been met, wherein the seed candidate solutions are not derived from candidate solutions of earlier generations; and generate a solution for the optimization problem from the computer simulation based, at least in part, on a successive generation of candidate solutions produced after said inserting, into the current generation of candidate solutions generated by the computer simulation, at least the first dataset that represents the first candidate solution.

7. The computer program product of claim 6, wherein the computer readable program code is further configured to select the first dataset based, at least in part, on matching a random number associated with the first dataset to a count of generations up to the first selected generation; wherein the random number was associated with the first dataset based on a fitness metric of the first candidate solution represented by the first dataset.

8. The computer program product of claim 6, wherein the computer readable program code being configured to determine that the criterion for inserting the candidate solutions for the optimization problem has been met comprises the computer readable program code being configured to determine that an aggregate of fitness metrics of the current generation of candidate solutions meets or exceeds a fitness metric threshold.

9. The computer program product of claim 6, wherein the computer readable program code being configured to determine that the criterion for inserting the candidate solutions for the optimization problem has been met comprises the computer readable program code being configured to determine that a count of generations up to the first selected generation is equal to an indicated number of generations.

10. The computer program product of claim 6, wherein the computer readable program code being configured to determine that the criterion for inserting the candidate solutions for the optimization problem has been met comprises the computer readable program code being configured to determine that an aggregate of fitness metrics of the current generation is within a threshold of a fitness metric of the first candidate solution.

11. A computer program product for optimizing seeding of evolutionary algorithm based computer simulations, the computer program product comprising:
a non-transitory computer readable medium having computer usable program code embodied therewith, the computer readable program code comprising:
computer usable program code configured to,
determine a plurality of seed candidate solutions to insert into an optimization problem, wherein the seed candidate solutions are points in the domain of the optimization problem where solutions to the optimization problem are likely to be found;
determine fitness metrics of each of the plurality of seed candidate solutions;
determine that a criterion for inserting the seed candidate solutions has been met by a first selected generation of candidate solutions while an evolutionary algorithm based computer simulation is running; and
insert the plurality of seed candidate solutions into subsequent generations of candidate solutions based, at least in part, on the fitness metrics, wherein the seed candidate solutions are not derived from candidate solutions of earlier generations.

12. The computer program product of claim 11, wherein the computer readable program code being configured to determine the fitness metrics of each of the plurality of seed candidate solutions is based, at least in part, on an indicated fitness evaluation function.

13. The computer program product of claim 11, wherein the computer readable program code being configured to determine that a criterion for inserting the seed candidate solutions has been met by a first selected generation of candidate solutions while an evolutionary algorithm based computer simulation is running comprises the computer readable program code being configured to:
determine an aggregate fitness metric of the first selected generation based, at least in part, on individual fitness metrics of the candidate solutions; and
determine that the aggregate fitness metric meets or exceeds a threshold fitness metric.

14. The computer program product of claim 11, wherein the computer readable program code being configured to insert the plurality of seed candidate solutions into subsequent generations of candidate solutions based, at least in part, on the fitness metrics comprises the computer readable program code being configured to sort the plurality of seed candidate solutions from least fit to most fit based on the fitness metrics.

15. The computer program product of claim 11, wherein the computer readable program code being configured to insert the plurality of seed candidate solutions into subsequent generations of candidate solutions based, at least in part, on the fitness metrics comprises the computer readable program code being configured to:
determine an insertion interval, wherein the insertion interval represents an average number of generations that should be generated between insertions of each of the plurality of seed candidate solutions; and
determine the subsequent generations to insert each of the plurality of seed candidate solutions in accordance with the insertion interval.

16. An apparatus comprising:
a processing unit;
a network interface; and
an evolutionary algorithm based simulator operable to,
determine that a criterion for inserting seed candidate solutions for an optimization problem has been met while an evolutionary algorithm based computer simulation is running and after a first selected generation of candidate solutions has been determined by the computer simulation;
insert, into a current generation of candidate solutions generated by the computer simulation, at least a first dataset that represents a first seed candidate solution in response to determining that the criterion for inserting seed candidate solutions has been met, wherein the seed candidate solutions are not derived from candidate solutions of earlier generations; and
generate a solution for the optimization problem from the computer simulation based, at least in part, on a successive generation of candidate solutions produced after said inserting, into the current generation of candidate solutions generated by the computer simulation, at least the first dataset that represents the first candidate solution.

17. The apparatus of claim 16, wherein the evolutionary algorithm based simulator being operable to select the first dataset based, at least in part, on matching a random number associated with the first dataset to a count of generations up to the first selected generation; wherein the random number was associated with the first dataset based on a fitness metric of the first candidate solution represented by the first dataset.

18. The apparatus of claim 16, wherein the evolutionary algorithm based simulator being operable to determine that the criterion for inserting the candidate solutions for the optimization problem has been met comprises the evolutionary algorithm based simulator being operable to determine that an aggregate of fitness metrics of the current generation of candidate solutions meets or exceeds a fitness metric threshold.

19. The apparatus of claim 16, wherein the evolutionary algorithm based simulator being operable to determine that the criterion for inserting the candidate solutions for the optimization problem has been met comprises the evolutionary algorithm based simulator being operable to determine that a count of generations up to the first selected generation is equal to an indicated number of generations.

20. The apparatus of claim 16, wherein the evolutionary algorithm based simulator being operable to determine that the criterion for inserting the candidate solutions for the optimization problem has been met comprises the evolutionary algorithm based simulator being operable to determine that an aggregate of fitness metrics of the current generation is within a threshold of a fitness metric of the first candidate solution.

* * * * *